(12) United States Patent
Huang

(10) Patent No.: US 7,379,296 B1
(45) Date of Patent: May 27, 2008

(54) NOTEBOOK COMPUTER WITH REPLACEABLE BATTERY HOLDER MODULE

(75) Inventor: Wei-Hao Huang, Taipei (TW)

(73) Assignee: Inventec Corporation, Taipei (TW)

( * ) Notice: Subject to any disclaimer, the term of this patent is extended or adjusted under 35 U.S.C. 154(b) by 53 days.

(21) Appl. No.: 11/598,758

(22) Filed: Nov. 14, 2006

(51) Int. Cl.
*G06F 1/16* (2006.01)

(52) U.S. Cl. ............... 361/686; 439/500; 320/126; 429/90

(58) Field of Classification Search ........... 439/500, 439/502, 623–624; 307/64–65; 320/124–126; 361/679–687, 724–727; 429/61, 90
See application file for complete search history.

(56) References Cited

U.S. PATENT DOCUMENTS

2004/0150368 A1 * 8/2004 Horigome ............... 320/132
2006/0133021 A1 * 6/2006 Fan ....................... 361/683

* cited by examiner

*Primary Examiner*—Hung V Duong
(74) *Attorney, Agent, or Firm*—Harness, Dickey & Pierce, P.L.C.

(57) ABSTRACT

A notebook computer with a replaceable battery holder module is provided, which comprises a notebook computer system and a replaceable battery holder module. With the setting of the replaceable battery holder module, when the original standard-equipped rechargeable battery or backup battery is running low, an ordinary long-life alkaline battery or ordinary rechargeable battery may be used in the notebook computer.

12 Claims, 3 Drawing Sheets

NOTEBOOK COMPUTER WITH REPLACEABLE BATTERY HOLDER MODULE

BACKGROUND OF THE INVENTION

1. Field of Invention

The present invention relates to a notebook computer with a replaceable battery holder module, and more particularly, to a notebook computer using ordinary long-life alkaline batteries or ordinary rechargeable batteries.

2. Related Art

In a network communication era, network and communication products are widely used for communication and message exchange. In order to keep contact and process information anywhere anytime, the notebook computer, light in weight and compact in size, has been developed based on the original desktop computer. It is a popular phenomenon in modern society to have a notebook computer. And many companies list the notebook computer as standard equipment for employees.

The notebook computer brings much happiness and convenience for modern people in daily life. Users can access the Internet or process information by using a notebook computer at the airport, outdoors, in a café, or on other occasions. The notebook computer can also be used for dealing with affairs and conferencing. For example, taking the notebook computer along to the client, we can make a presentation, product introduction, or exchange information just by powering on the notebook. However, if the notebook computer is short of battery during use, it is no longer convenient, and the entire action is interrupted.

Due to the consideration of the volume and weight of the notebook computer, the power capacity of the notebook computer is always limited, and the battery of notebook computer needs to be recharged frequently. Usually, a charger is used to recharge the battery of the notebook computer. Most devices for storing electric power of the notebook computer are rechargeable lithium batteries. Battery packs equipped in notebook computers include so-called 6 Cell, 8 Cell, and those of other, different specifications, depending on the specifications of the notebook computer. The battery packs are assembled in a battery holder, and usually, users cannot change battery packs. When a battery pack is out of power, users have to look for a receptacle for recharging. Therefore, users have to carry a backup battery along with the notebook computer for emergency use. However, there might be receptacles, but not everywhere. When the battery runs out of power and no receptacles can be found, the notebook computer cannot exert its function, even if it has a powerful function.

SUMMARY OF THE INVENTION

The present invention is directed to solve a conventional problem existing in the notebook computer, that is, the notebook computer taken along cannot work when the standard equipped rechargeable battery or rechargeable backup battery thereof is out of power, and cannot be recharged immediately, which is a burden on users to take along a notebook computer that isn't working.

To achieve above object, the present invention provides a notebook computer with a replaceable battery holder module, which comprises a notebook computer system and a replaceable battery holder module. The replaceable battery holder module further includes a battery holder case, at least two conductive contacts, and a connector.

The notebook computer system has a connector socket disposed on the circuit board thereof.

The battery holder case is a hollow battery holder case having a base plate and a plurality of joint vertical plates extending upwards around the base plate.

At least two conductive contacts are a first conductive contact and a second conductive contact respectively, which are correspondingly disposed on the vertical plates inside the battery holder case.

The connector is fixed on the base plate. The connector has a substrate with a protruding portion protruding from the battery holder case. And at least one first connection point and at least one second connection point are disposed on the protruding portion, wherein the first and second contacts are conductive, and the first conductive contact is electrically connected to the first connection point, and the second conductive contact is electrically connected to the second connection point.

With the implementation of the present invention, the following progressive efficiencies can be achieved.

1. The notebook computer can be recharged more conveniently and rapidly.
2. The case that the notebook computer cannot work due to being short of electric power can be reduced significantly.
3. Users can use the notebook computer more conveniently outdoors or on journeys, by taking along or purchasing long-life alkaline batteries in a shop at any time.
4. As the replaceable battery holder module and the battery are separated, the weight for carrying can be reduced significantly. When going abroad, users can take along the replaceable battery holder module only, and purchase batteries locally and install the batteries for use.
5. The replaceable battery holder module is different from the battery of the conventional notebook computer in which the whole battery module must be replaced when its life ends.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

Figure 1:
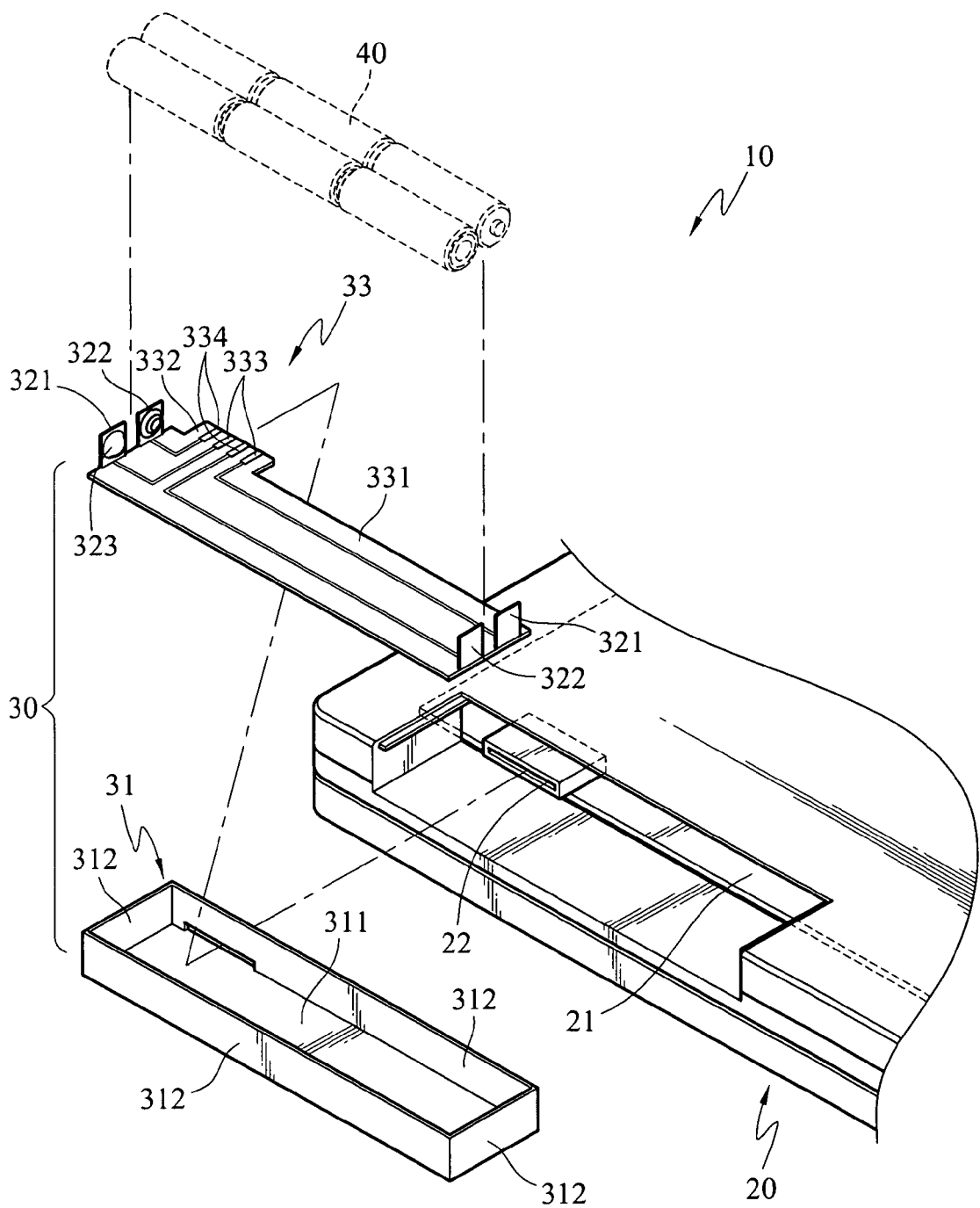
FIG. 1 is an exploded spatial view of a notebook computer with a replaceable battery holder module according to an embodiment of the present invention.
Figure 2:
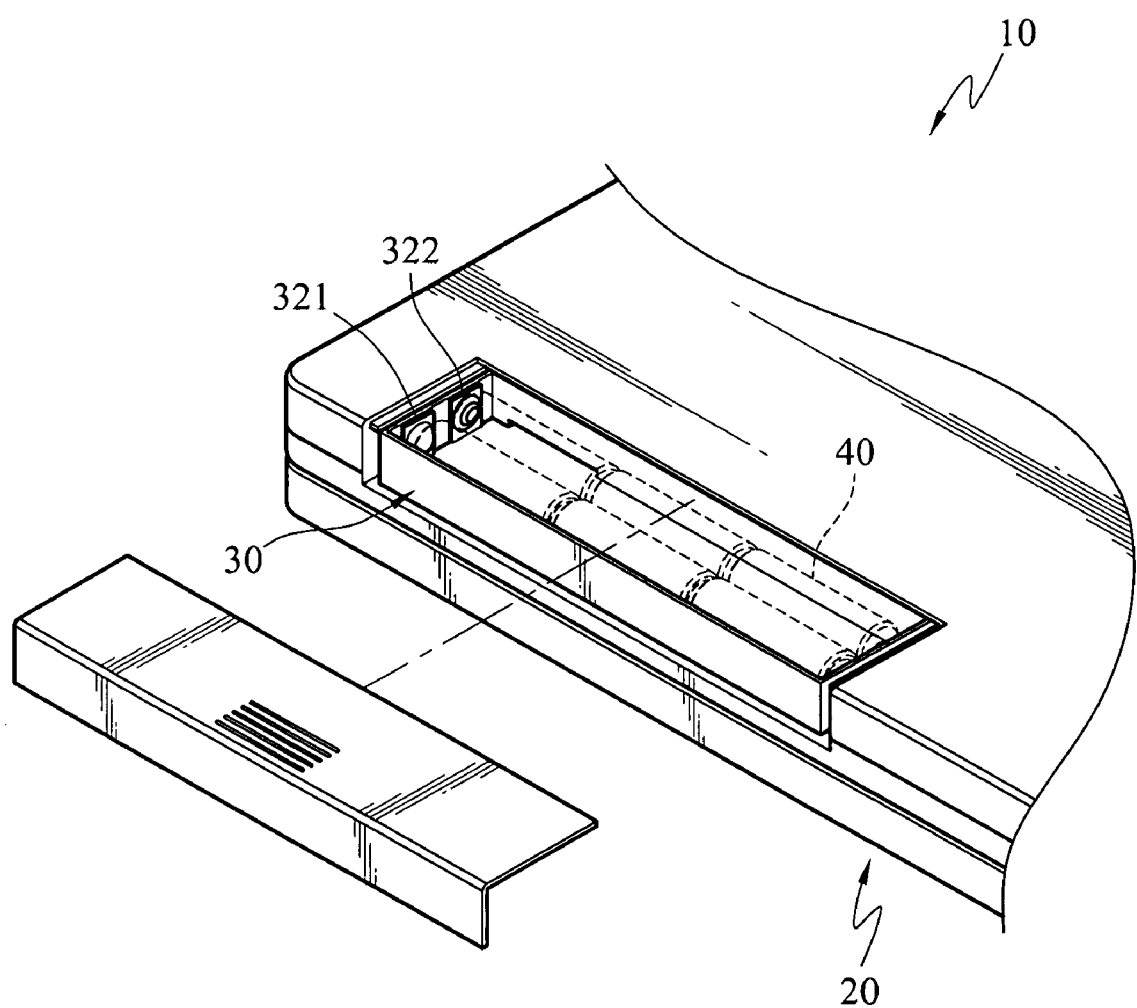
FIG. 2 is a spatial combined view of a notebook computer with a replaceable battery holder module according to an embodiment of the present invention.
Figure 3:
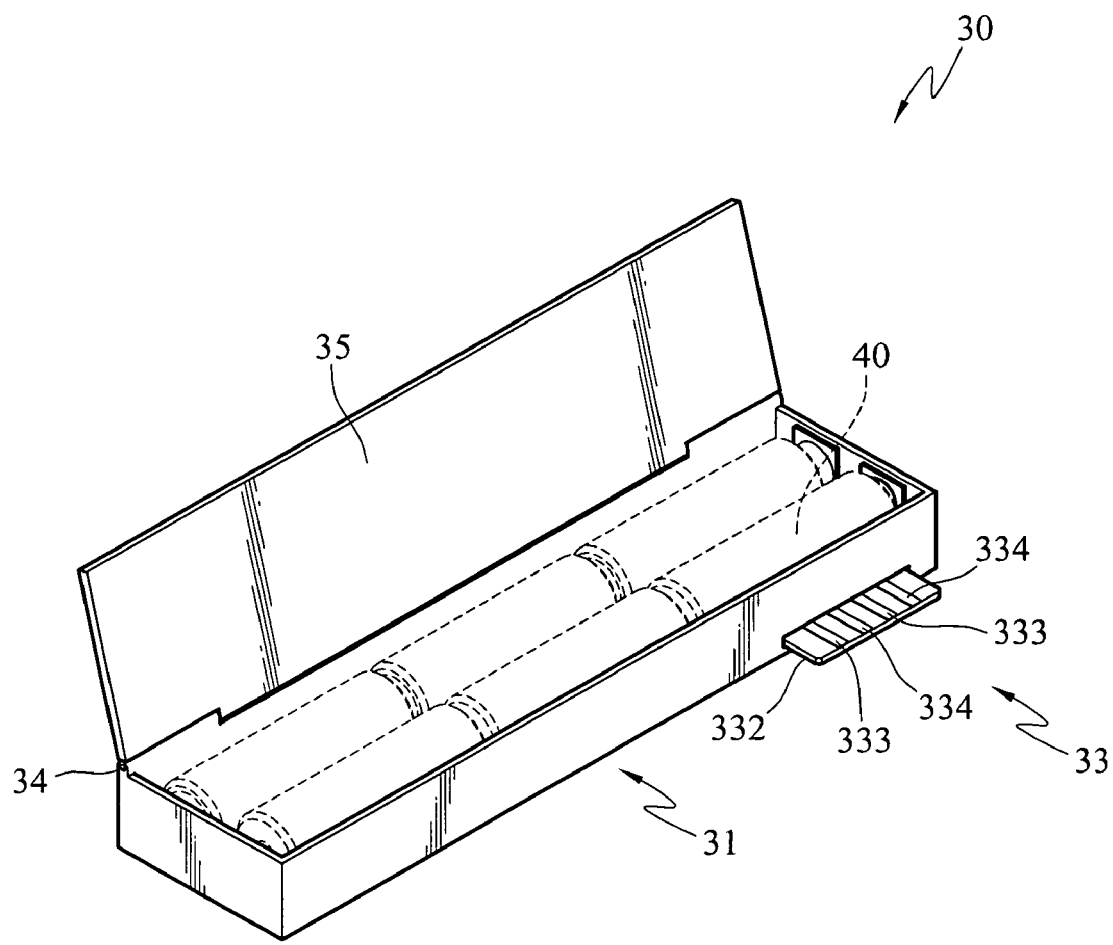
FIG. 3 is a spatial view of a replaceable battery holder module with a cover applied in the present invention.

As shown in FIG. 1, it is an exploded spatial view of a notebook computer 10 with a replaceable battery holder module according to an embodiment of the present invention. As shown in FIG. 2, it is a spatial combined view of a notebook computer 10 with a replaceable battery holder module according to an embodiment of the present invention. As shown in FIG. 3, it is a spatial view of a replaceable battery holder module 30 with a cover 35 applied in the present invention.

Referring to FIGS. 1 and 2, in the embodiment, a notebook computer 10 with a replaceable battery holder module comprises a notebook computer system 20 and a replaceable battery holder module 30. The replaceable battery holder module 30 further includes a battery holder case 31, at least two conductive contacts 321, 322, and a connector 33.

The notebook computer system 20 has the function and appearance the same as those of the ordinary notebook computer, but is different in that a connector socket 22 is disposed on the circuit board 21 of the notebook computer system 20. The connector socket 22 is a power input terminal, and is electrically connected to the replaceable battery holder module 30, so as to obtain electric power provided by the replaceable battery holder module 30.

The battery holder case 31 is a hollow battery holder case, with a base plate 311 and a plurality of joint vertical plates 312 extending upwards around the base plate 311. The hollow portion of the battery holder case 31 is used to accommodate ordinary long-life alkaline batteries or ordinary rechargeable batteries 40. Long-life alkaline batteries 40 are available in any ordinary convenience store. Therefore, when the original standard-equipped rechargeable battery or backup battery of the notebook computer is out of power, the notebook computer can be made to keep on working by purchasing long-life alkaline batteries 40. Also, the ordinary rechargeable batteries 40 are rather popular, and therefore are very convenient in use.

To make the ordinary long-life alkaline batteries or ordinary rechargeable batteries 40 provide sufficient electric power, in the hollow portion of the battery holder case 31, the ordinary long-life alkaline batteries or ordinary rechargeable batteries 40 are allowed to be disposed in series and parallel. Generally speaking, the battery holder case 31 is made of a plastic material.

At least two conductive contacts 321, 322 are a first conductive contact 321 and a second conductive contact 322, which are disposed on the substrate 331 correspondingly. The first conductive contact 321 and the second conductive contact 322 are disposed on two ends of the ordinary long-life alkaline batteries or ordinary rechargeable batteries 40. The first conductive contact 321 is electrically connected to the positive electrode of the ordinary long-life alkaline batteries or ordinary rechargeable batteries 40. The second conductive contact 322 is electrically connected to the negative electrode of the ordinary long-life alkaline batteries or ordinary rechargeable batteries 40.

In order to achieve a better electrical connection effect, the first conductive contact 321 is a metal plate with favorable conductivity, and a circular conductive bump 323 is formed on the metal plate. The second conductive contact 322 is a spring-like contact made of a metal wire with favorable conductivity.

The connector 33 is fixed on the base plate 311. The connector 33 has a substrate 331, and the substrate 331 has a protruding portion 332 protruding from the battery holder case 31. At least one first connection point 333 and at least one second connection point 334 are disposed on the protruding portion 332, wherein the first and second connection points are conductive, and electrically connected to the connector socket 22, such that the electric power of the replaceable battery holder module 30 can be provided to the notebook computer system 20, making the notebook computer system 20 work normally. The first conductive contact 321 is electrically connected to the first connection point 333, and the second conductive contact 322 is electrically connected to the second connection point 334, such that the electric power of the ordinary long-life alkaline batteries or ordinary rechargeable batteries 40 can be transferred to the connection points.

The substrate 331 of the connector 33 is a printed circuit board. The first connection point 333 and the second connection point 334 are formed on the substrate 331 respectively, and they are copper foils which are not connected with each other, such as so-called "gold fingers". The first conductive contact 321 is electrically connected to the first connection point 333 by a lead, and the second conductive contact 322 is electrically connected to the second connection point 334 by another lead. Alternatively, the first conductive contact 321 can be electrically connected to the first connection point 333 by a conductor formed on the substrate 331, the second conductive contact 322 can be electrically connected to the second connection point 334 by another conductor formed on the substrate 331.

Referring to FIG. 3, it is a spatial view of a replaceable battery holder module 30 with a cover 35. In order to make the ordinary long-life alkaline batteries or ordinary rechargeable batteries 40 firmly disposed in the battery holder case 31, a set of pivots 34 can further be disposed at one side of the upper edge of the battery holder case 31, and the set of pivots 34 is further combined with a cover 35. After the long-life alkaline batteries or ordinary rechargeable batteries 40 are disposed in the battery holder case 31, the cover 35 is put on. Therefore, when the notebook computer is taken along, the ordinary long-life alkaline batteries or ordinary rechargeable batteries 40 will not depart from the battery holder case 31 when shaken.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A notebook computer with a replaceable battery holder module, comprising:
    a notebook computer system, with a connector socket disposed on the circuit board of the notebook computer system; and
    a replaceable battery holder module, including:
        a battery holder case, which is a hollow battery holder case, and has a base plate and a plurality of joint vertical plates extending upwards around the base plate;
        at least two conductive contacts, which are a first conductive contact and a second conductive contact respectively, and disposed on the vertical plates inside the battery holder case correspondingly; and
        a connector, fixed on the base plate, and having a substrate with a protruding portion protruding from the battery holder case, wherein at least one first connection point and at least one second connection point are disposed on the protruding portion, and they are conductive and electrically connected to the connector socket, and the first conductive contact is electrically connected to the first connection point and the second conductive contact is electrically connected to the second connection point.

2. The notebook computer as claimed in claim 1, wherein the material of the battery holder case is a plastic material.

3. The notebook computer as claimed in claim 1, wherein the first conductive contact is a metal plate with favorable conductivity, and a circular conductive bump is formed on the metal plate.

4. The notebook computer as claimed in claim 1, wherein the second conductive contact is a spring-like contact made of a metal wire of favorable conductivity.

5. The notebook computer as claimed in claim 1, wherein the substrate is a printed circuit board.

6. The notebook computer as claimed in claim 1, wherein the first connection point is a copper foil formed on the substrate.

7. The notebook computer as claimed in claim 1, wherein the second connection point is a copper foil formed on the substrate.

8. The notebook computer as claimed in claim 1, wherein the first conductive contact is electrically connected to the first connection point by a first lead.

9. The notebook computer as claimed in claim 1, wherein the second conductive contact is electrically connected to the second connection point by a second lead.

10. The notebook computer as claimed in claim 1, wherein the first conductive contact is electrically connected to the first connection point by a first conductor formed on the substrate.

11. The notebook computer as claimed in claim 1, wherein the second conductive contact is electrically connected to the second connection point by a second conductor formed on the substrate.

12. The notebook computer as claimed in claim 1, wherein a set of pivots are disposed at one side of the upper edge of the battery holder case, and the set of pivots is further combined with a cover.

* * * * *